(12) United States Patent
Christie et al.

(10) Patent No.: US 10,830,005 B2
(45) Date of Patent: Nov. 10, 2020

(54) CONNECTION MECHANISM

(71) Applicant: Sentergy Limited, Aberdeen (GB)

(72) Inventors: Stewart Gordon George Christie, Aberdeen (GB); Andrew John Elrick, Peterhead (GB); Iain Morrison Macleod, Newmachar (GB); Paul Church, Aberdeen (GB)

(73) Assignee: Impact Selector Limited, Aberdeen (GB)

( * ) Notice: Subject to any disclaimer, the term of this patent is extended or adjusted under 35 U.S.C. 154(b) by 665 days.

(21) Appl. No.: 15/568,480

(22) PCT Filed: Apr. 22, 2016

(86) PCT No.: PCT/GB2016/051126
§ 371 (c)(1),
(2) Date: Oct. 22, 2017

(87) PCT Pub. No.: WO2016/170356
PCT Pub. Date: Oct. 27, 2016

(65) Prior Publication Data
US 2018/0119498 A1    May 3, 2018

(30) Foreign Application Priority Data
Apr. 23, 2015 (GB) .................................. 1506938.8

(51) Int. Cl.
*E21B 17/10* (2006.01)
*E21B 23/14* (2006.01)
(Continued)

(52) U.S. Cl.
CPC ...... *E21B 17/1064* (2013.01); *E21B 17/1057* (2013.01); *E21B 23/14* (2013.01);
(Continued)

(58) Field of Classification Search
CPC .... F16B 2/10; F16B 19/004; E21B 2023/008; E21B 17/1057; E21B 17/1064;
(Continued)

(56) References Cited

U.S. PATENT DOCUMENTS 1,715,547 A * 6/1929 Hardesty ............. E21B 17/1057
175/325.3
4,021,083 A  5/1977 Anderson
(Continued)

FOREIGN PATENT DOCUMENTS

WO  2013/058656 A1  4/2013

OTHER PUBLICATIONS

International Search Report and Written Opinion dated Jul. 25, 2016 for International Appln. No. PCT/GB2016/051126, 11 pages.

*Primary Examiner* — Jonathan P Masinick
(74) *Attorney, Agent, or Firm* — Boisbrun Hofman, PLLC

(57) ABSTRACT

A connection mechanism (4) comprises first and second components (6, 8) which can be selectively coupled together, one of the first or second components comprises a locking member (25) which is moveable between a first state and a second state, the other of the first or second component comprises means (16) for initially moving the locking member from the first to the second state as the first and second components are initially drawn together and means (19) for returning the locking member to the first state once the first and second components are fully engaged together to prevent disengagement of the first and second components.

22 Claims, 5 Drawing Sheets

(51) Int. Cl.
*F16B 2/10* (2006.01)
*E21B 23/00* (2006.01)
*F16B 19/00* (2006.01)

(52) U.S. Cl.
CPC .............. *F16B 2/10* (2013.01); *F16B 19/004* (2013.01); *E21B 23/001* (2020.05)

(58) Field of Classification Search
CPC ...... E21B 23/001; E21B 23/14; Y10T 403/60; Y10T 403/602; Y10T 403/608
See application file for complete search history.

(56) References Cited

U.S. PATENT DOCUMENTS

| | | | |
|---|---|---|---|
| 6,250,406 B1 * | 6/2001 | Luke | E21B 17/105 |
| | | | 175/325.2 |
| 7,055,631 B2 * | 6/2006 | Mitchell | E21B 17/1007 |
| | | | 175/325.5 |
| 8,511,377 B2 * | 8/2013 | Casassa | E21B 17/1057 |
| | | | 166/241.6 |
| 8,733,455 B2 * | 5/2014 | Shaikh | E21B 17/1057 |
| | | | 166/380 |
| 2012/0255744 A1 | 10/2012 | Shaikh et al. | |
| 2012/0298376 A1 | 11/2012 | Twardowski | |
| 2017/0067299 A1 * | 3/2017 | Copold | E21B 17/1057 |

\* cited by examiner

CONNECTION MECHANISM

This invention relates to a connection mechanism and more particularly to a connection mechanism incorporated into a transport assembly, and more particularly to a connection mechanism incorporated into a transport assembly of particular use in connection with the deployment of wellbore apparatus such as tool strings, tubing strings or other equipment which may need to be deployed and transported into position in a wellbore for different operations.

In many fields it is desirable to support and move equipment with the assistance of some form of transport assembly, such as for example, a roller or wheel assembly. This is particularly the case in the oil and gas industry where wellbore apparatus is deployed into and recovered from the wellbore during operations. Such transport assemblies are particularly useful in deviated wellbores where the longitudinal axis of the wellbore is non vertical, and in some cases can be horizontal, as the roller or wheel assembly contacts the wellbore wall and provides support for the string to keep the sections of the string off the wall, reducing friction of the string. This allows the string to move through wellbore more easily.

Typically, the transport assembly comprises a tubular main body which may be formed of a number of sections which are connected together. For example, the body may be formed of two cooperating halves which are hinged together or otherwise connected through screws or bolts to secure the halves together to form a tubular body which can surround a tool string as it is deployed into the wellbore.

Whilst known transport assemblies have been found to be helpful in overcoming problems in transporting apparatus through the wellbore, it is important that the connection between the sections of the assembly is secure as any unintended release of the transport assembly could lead to substantial downtime of production in the wellbore while the parts of the transport assembly are recovered. The transport assemblies are required to operate in a high temperature, high pressure environment which often persists downhole and wellbore fluids circulating through the wellbore can carry rock and sand sediment for example which can affect the operation of equipment and can present a hazard to the transport assemblies.

Furthermore, if the transport assembly is not securely fastened around the tool string as it is deployed into the wellbore, this could lead to further problems and remedial action.

Additionally, particulate material in the well bore fluids presents a hazard to the outer surface of the transport assembly and particularly to the connection mechanism between the segments of the assembly. In the known transport assemblies, the connection mechanism is provided on the outer surface of the transport assembly, for example by bolts or screws as noted above. Debris circulating in the well can become entrained within the connection mechanism and lead to failure of the connection mechanism and therefore failure of the transport assembly itself.

It is an aim of the present invention to provide a connection mechanism which can be incorporated into a transport assembly in order to provide a secure connection between the sections of the assembly which overcomes or at least mitigates the aforementioned problems.

Alternatively or in addition, it is an aim of the present invention to provide a connection mechanism in which the co-operating parts of the mechanism are internally mounted within the component in which they are incorporated such that the problems associated with debris fouling or becoming entrained between the cooperating parts of the mechanism are at least mitigated or obviated.

According to one aspect of the present invention there is provided a connection mechanism comprising first and second components which can be selectively coupled together, one of the first or second components comprising a locking member which is moveable between a first state and a second state, the other of the first or second components comprising means for initially moving the locking member from the first to the second state as the first and second components are initially drawn together and means for returning the locking member to the first state once the first and second components are fully engaged together to prevent disengagement of the first and second components.

Thus the operation of bringing the two components of the connection mechanism together both closes the connection mechanism but also sets the locking member into a locked state thus preventing unintended disengagement of the components of the connection mechanism.

Once the two components are fully engaged and the locking member is in the first state, the two components cannot be separated without intervention.

Preferably the means for moving the locking member from the first to the second state comprises a cam surface on the other of the first or second components.

Advantageously the other of the first or second components comprises a flange upon which the cam surface is formed.

Preferably also the cam surface is formed on an upper surface of the flange.

Conveniently the locking member contacts the cam surface as the first and second components are initially drawn together.

Preferably the locking member comprises an elongate pin which is length adjustable.

Advantageously the pin comprises first and second tubular elements which are axially aligned.

Preferably the first and second tubular elements are connected together via a resilient member.

Advantageously, the resilient member comprises a spring.

Preferably also the spring is a coil spring.

Preferably when the locking member is in the first state, the spring is at rest and when the locking member is in the second state, the spring is energised.

Advantageously when the spring is energised, it is in a compressed state.

Preferably also the first and second tubular elements comprise mounting points for each end of the spring.

Advantageously one or more bodies are mounted on locking member.

Preferably the one or more bodies are spheres.

Advantageously the one or more bodies are integrally formed with the tubular elements.

Advantageously one of the first or second components of the connection mechanism comprises a socket for mounting the locking member.

Preferably, the depth of the socket within which the locking member is mounted is greater than the radius of the spheres on the locking member.

Advantageously the second component of the connection mechanism comprises means for energising the locking member and moving the locking member between the first and second states.

Advantageously the energising means comprises one or more channels provided on a flange of the component.

Preferably the one or more channels are provided on the upper surface of the flange of the component.

Preferably the flange of the second component projects from the end of the second component.

Preferably the one or more channels are angled between the outer surface of the flange to the inner surface of the flange.

Advantageously the channels are provided in two sets on either side of the centre portion of the flange.

Preferably also, the channels extend from an outer surface of the flange towards an inner surface of the flange.

Advantageously the means for returning the locking member to the first state comprises a groove in the other of the first or second components.

Preferably the groove is provided behind the cam surface and preferably behind the inner ends of the channels on the flange.

Preferably a window or slot is provided through the first component to facilitate access for a tool to move the locking member from the first to the second state.

According to a further aspect of the present invention there is provided a wellbore transport assembly tool incorporating a connecting mechanism according to the first aspect of the invention.

An embodiment of the present invention will now be described with reference to and as shown in the accompanying figures in which.

Figure 1:
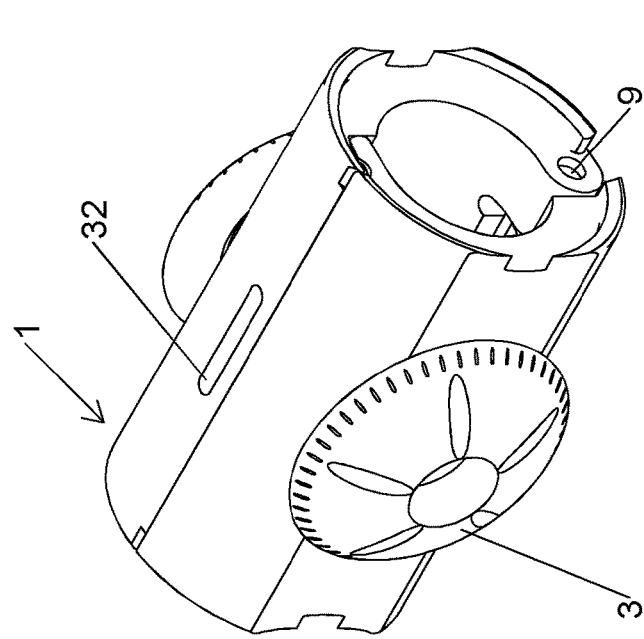
FIG. 1 is a schematic perspective view of a downhole transport assembly incorporating a connection mechanism according to one aspect of the present invention.

Turning now to the figures, FIG. 1 shows an example of a transport assembly tool 1 incorporating a connection mechanism 4 according to one aspect of the present invention.

The tool shown in FIG. 1 is formed of two co-operating shell segments 2 or halves which are brought together and held in a closed position such that in use it can surround a down hole tool or component (not shown). In the embodiment shown, one or more rotating members 3, which in some embodiments may be rollers or wheels are mounted on the outer surface of the transport assembly tool 1 to facilitate movement of the tool through a wellbore as the rotating members rotate along the well bore surface and keep the outer surface of the wellbore tool spaced from the inner surface of the wellbore.

Figure 2:
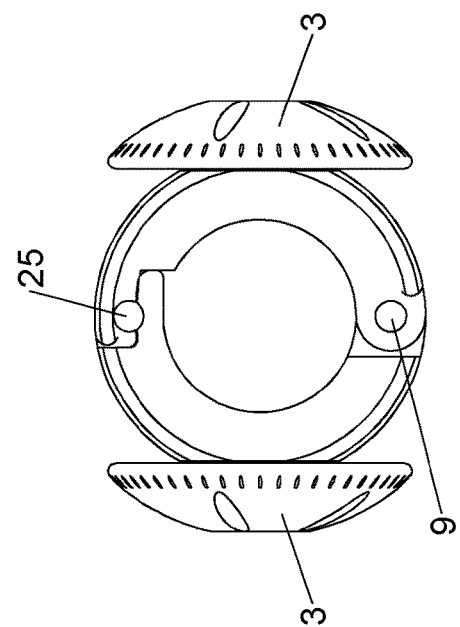
FIG. 2 is an end view of the transport assembly of FIG. 1.
Figure 3:
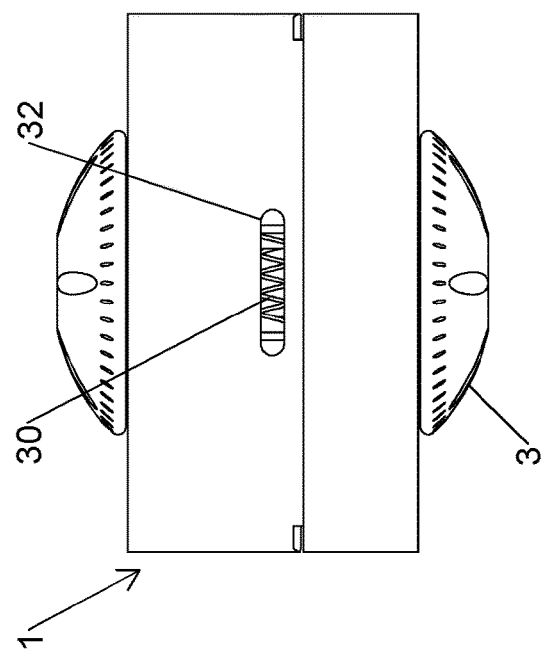
FIG. 3 is a top view of the transport assembly of FIG. 1.

The connection mechanism 4 provided between the co-operating shell segments 2 of the transport assembly tool is shown in FIGS. 1-3 in a closed condition with the shell segments 2 firmly connected together such that the transport assembly tool 1 forms a tubular body which can surround a downhole tool and support the tool as it passes through the wellbore.

Figure 4:
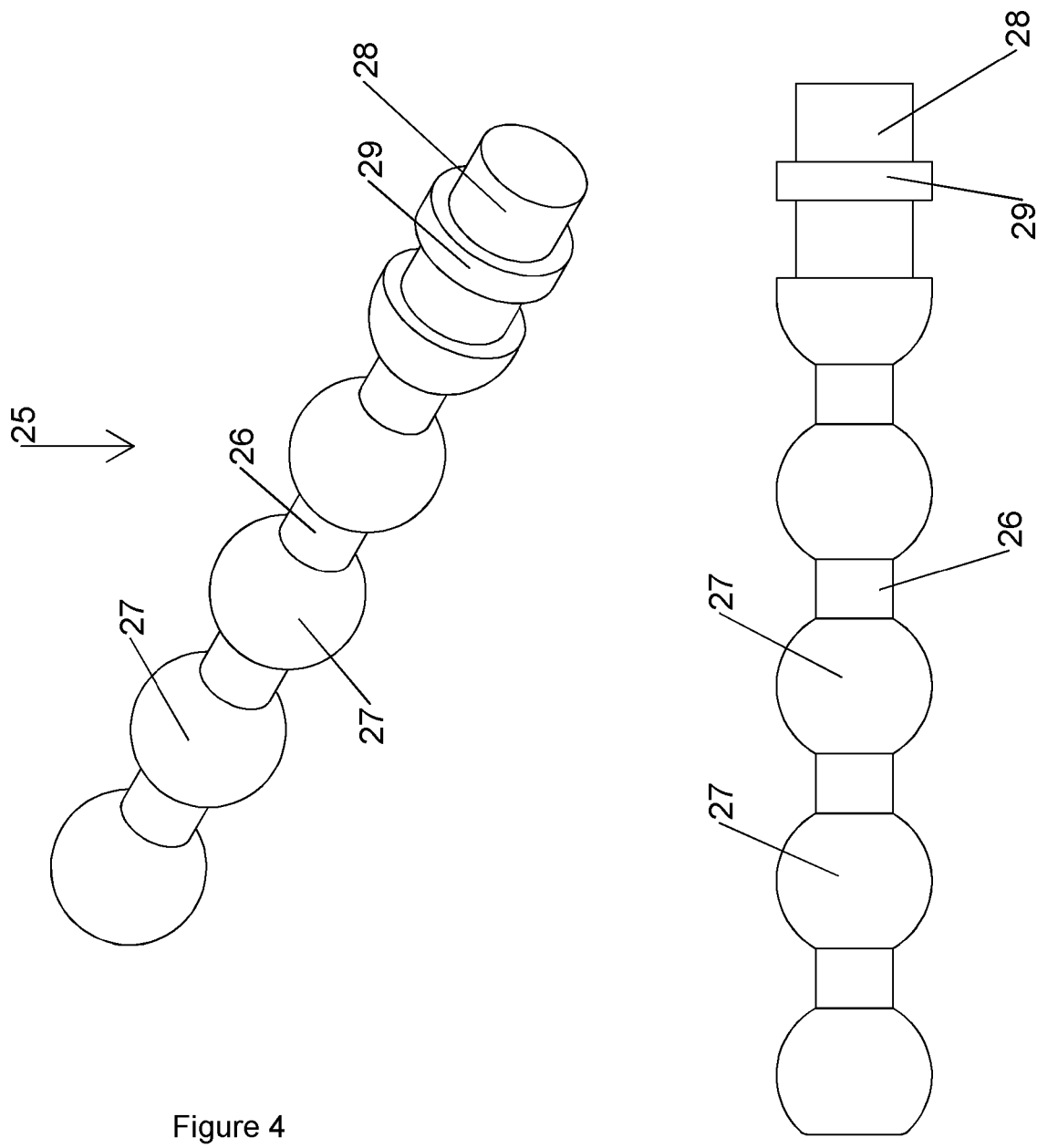
FIG. 4 is an exploded view of part of a locking pin of the connection mechanism shown in FIG. 1.
Figure 5B:
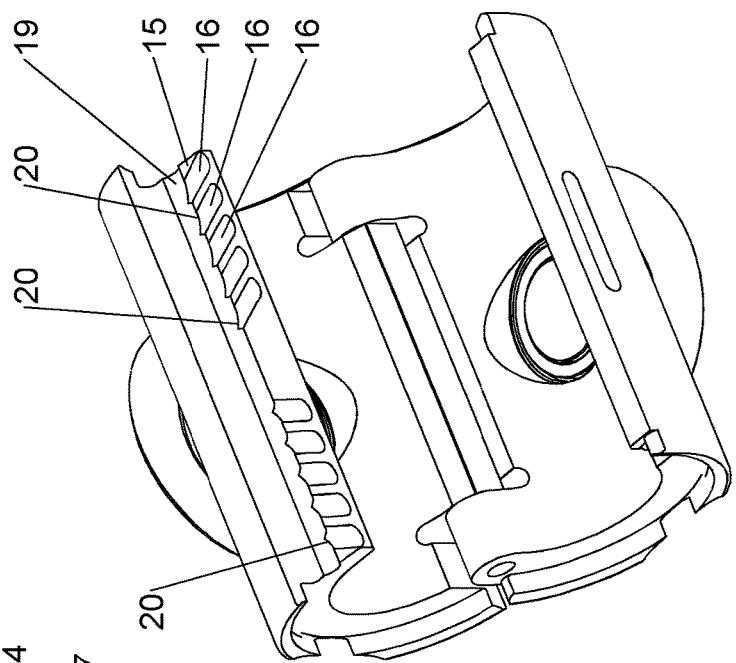
FIG. 5B is a schematic perspective view from the other side of the transport assembly showing the connection mechanism from the other side in detail.
Figure 5:
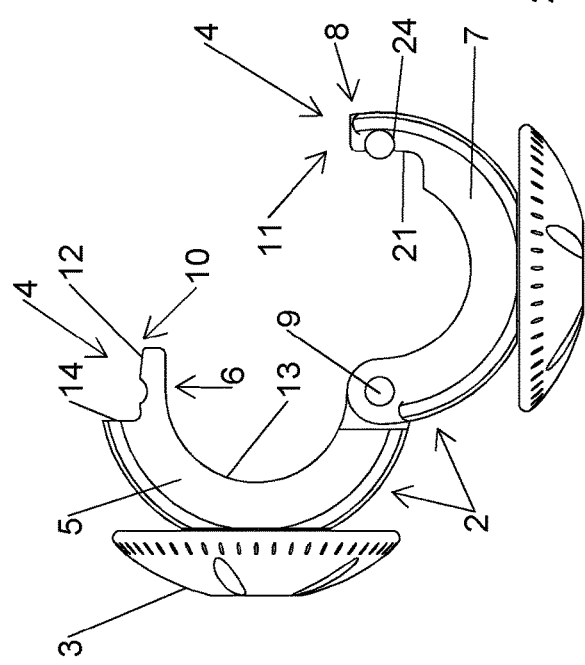
FIG. 5 is an end view of the transport assembly of FIG. 1 in an open condition.

The connection mechanism 4 of the present invention is shown in more detail in FIGS. 4-7 of the drawings. Turning to FIG. 5, the transport assembly tool 1 of FIG. 1 is shown from one end in FIG. 5A in an open condition and in perspective views from each side in FIGS. 5A and 5B.

The first segment 5 of the transport assembly tool carries a first component 6 of the connection mechanism 4 and the second segment 7 of the tool carries a second component 8 of the connection mechanism. As shown in FIG. 5, the first and second segments of the transport assembly tool are connected through a standard hinge assembly 9. The first and second components 6,8 of the connection mechanism are provided on the distal ends 10, 11 of the segments remote from the hinge assembly 9.

The first component 6 of the connection mechanism comprises a cam surface provided by a flange 12 which extends from the distal end 10 of the first segment 5.

As shown in FIG. 5, the flange 12 is integrally formed with the first segment 5 and projects from the internal surface 13 of the segment beyond the distal end of the outer surface 14 of the first segment, thus the flange has a thickness which is less than the thickness of the first segment 5 at the distal end therefor and may be approximately half the thickness of the first segment. The upper surface 15 of the flange, is profiled and in the embodiment shown is formed with a plurality of channels 16. The channels 16 extend from the outer edge 18 of the flange, remote from the distal end of the first segment towards the inner edge of the flange and have a generally shallow U-shaped form.

The channels 16 in the illustrated embodiment are separated into two sets, one on each side of the centre portion 17 of the upper surface of the flange. Each set of channels is oriented inwardly towards the centre of the flange 17 away from the outer edges of the flange. Thus the two sets of channels 16 are angled towards one another on each side of the flange. In some embodiments, the channels may for example be provided at a helix pitch of around 105 mm to the centreline of the flange.

The channels 16 have a depth of approximately half of the thickness of the flange and extend from the outer edge 18 of the flange approximately halfway back towards the distal end 10 of the first segment 5 of the transport assembly. In the embodiment shown, 5 channels are provided on each side of the centre portion 17 on the upper surface of the flange, although in alternative embodiments, the number of channels on each side of the flange may be changed and there may be a different number of channels on one side of the flange from the other.

A shallow groove 19 is formed in the upper surface 15 of the flange behind the inner ends 20 of the channels 16. The groove extends from one side edge of the flange to the other along the upper surface of the flange. The groove may have a depth similar to that of the channels in the flange.

The second component 8 of the connection mechanism 4 is provided on the distal end 11 of the second shell segment 7 of the transport assembly tool. An undercut 21 is formed in the distal end 11 of the second shell segment such that an outer portion of the second shell segment 7 projects beyond the distal end of the inner surface by a similar distance as the flange of the first segment extends beyond the distal end 10 of the first segment.

A groove 24 is formed in the underside of the projecting portion of the second component. The groove extends from one side of the second segment to the other. Spring-loaded Locking pins or latches 25 are securely mounted within the groove. When the distal ends 10, 11 of the two segments 5, 7 are brought together, the undercut lower surface 21 of the second component passes over and engages with the flange 15 on the projecting portion of the first segment as shown in FIG. 2 of the drawings.

The locking pin 25 is shown in more detail in FIG. 4 and comprises two substantially elongate rods 26, with a plurality of bodies such as beads or spheres 27 mounted on or integrally formed along the rods. The beads 27 are spaced along the rods and the spacing between the beads corresponds to the spacing between the centre of each adjacent pair of the channels 16 in the flange 15 of the first segment. In the embodiment shown there are 5 beads, or partial beads provided upon each rod 26 of the locking pin. The beads are illustrated as being spaced at regular intervals but the spacing between each adjacent pair of beads may be different if required.

One end of each of the rods is provided with a mounting boss 28 which is co-axial with the rod but has a larger diameter than the diameter 26 of the rod. A stop member 29 is mounted approximately half way along the outer surface of each of the mounting bosses. The stop members comprise a region of the mounting boss which has an increased diameter than the main body of the mounting boss. The stop member may have a similar diameter as the beads provided on the rods. The mounting bosses 28 and the stop members 29 may be integrally formed with the rods 26 or may be connected to the rods by a known connection system.

The mounting bosses 28 are adapted to receive the respective ends of a resilient spring member 30, preferably a coil spring, which are placed over the mounting boss 28 and butt against the stop member 29 to prevent the spring member from disengaging from the rods and therefore to hold the two rods 26 together in axial alignment as will be more fully described below.

Figure 5A:
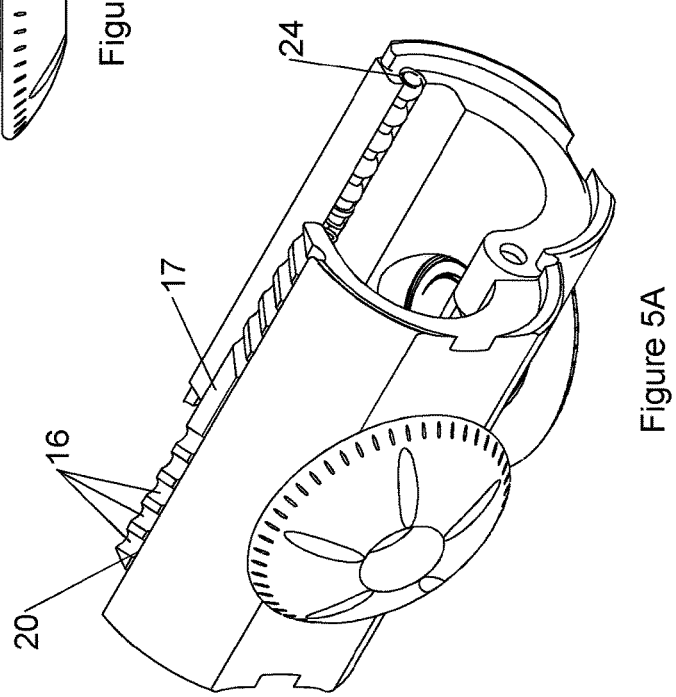
FIG. 5A is a schematic perspective view from one side of the transport assembly showing the connection mechanism from one side in detail.

In FIG. 5A, the locking pin is shown to be mounted within the groove 24 in the underside of the undercut surface 21 of the second segment 7. The groove is of a depth to receive the locking pin 25 such that more than half of the diameter of the beads 27 is contained within the groove. The inner surface of the groove is rounded such that the beads 27 cannot pass out of the groove 24 once the locking pin is loaded into the groove as will be described below.

A window or slot 32 is provided through the outer surface of the second component of the connection mechanism and provides access from the outer surface of the component into the groove 24. In the illustrated embodiment, the slot is provided approximately half way between the side edges of the component.

The stepwise operation of the connection mechanism 4 will now be described in relation to the transport assembly tool to which it is mounted in the illustrated embodiment.

When a transport assembly tool 1 incorporating the connection mechanism 4 of the present invention is to be mounted around a well tool for deployment into the wellbore, the transport assembly tool is prepared by initially mounting the coiled spring member 30 between the two mounting bosses 28 of the rods of the locking pin 25. Each end of the spring member is fastened over or fixed around the stop members 29 on the mounting bosses. The assembled locking pin 25 is then inserted into the groove 24 in the undercut surface of the second component of the connection mechanism. This is achieved by passing the locking pin into the groove 24 through one side wall of the projecting portion of the segment that forms the second component 7. The opening in the side wall is then crimped or otherwise closed or sealed to prevent the locking pin 25 from being withdrawn from the groove 24. As noted above, a portion of the outer surface of the beads 27 along the surface of the locking pin project through the groove 24 in the second component and the locking pin can freely rotate within the groove, however the diameter of the beads 27 being greater than the opening of the groove 24 along the under surface of the second component, prevents the locking pin 25 from passing out of the groove.

The spring member 30 at rest acts to hold the two rods 26 of the locking pin apart. When loaded into the groove 24, the spring member 30 is lies beneath the slot 32 through the outer wall of the second component of the connection mechanism and is visible through the slot as shown for example in FIG. 3.

FIGS. 6A to 6F show the cooperation of the locking pin 25 and the profiled flange 15 of the first segment of the transport assembly tool 1 as the two components of the connection mechanism are brought together.

Figure 6A:
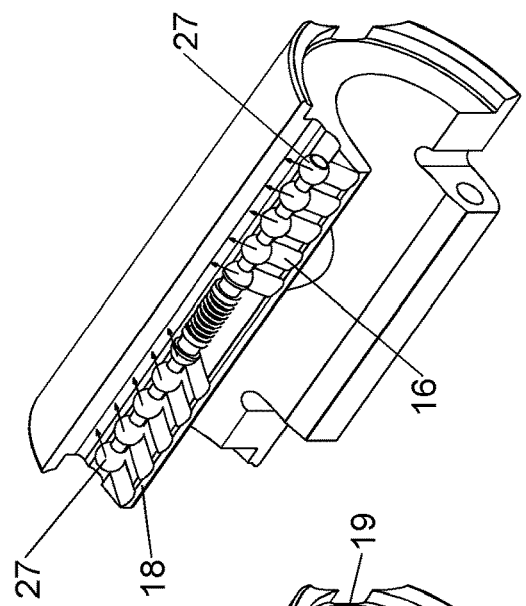
FIGS. 6A-6F show the locking pin of the connection mechanism moving from an unlocked to a locked position to close the two components of the transport assembly together.

By hinging the segments 5,7 of the transport assembly tool 1 together, the two distal ends 10, 11 of the tool segments approach one another and the two cooperating components 6,8 of the connection mechanism are brought together. Initially as shown in FIG. 6A, as the projecting undercut portion of the second component begins to overlap the upper surface of the projecting flange 15 of the first component, the beads 27 of the locking pin are aligned with the outer ends of the channels 16 at the outer edge 18 of the flange. Each bead 27 registers with one of the channel openings 16 and the spring member 30 mounted between the adjacent ends of the rods 26 of the locking pin registers with the centre portion 17 on the upper surface of the flange 15 between the two sets of channels.

Figure 6B:
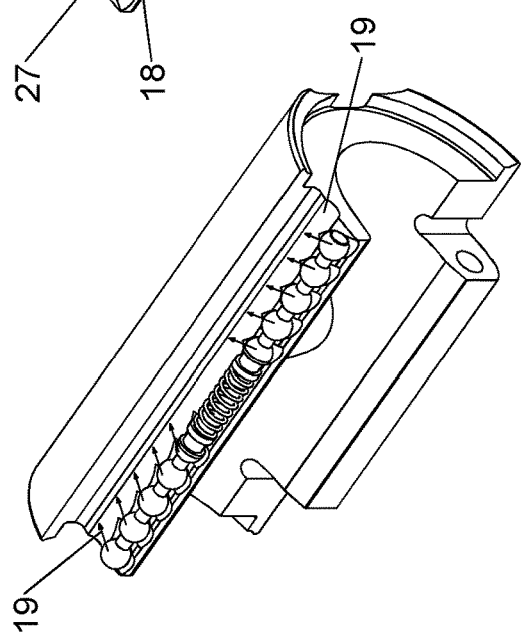

As shown in FIG. 6B, as the two components of the connection mechanism continue to come together, the beads 27 of the locking pin pass into the channels 16 on the upper surface of the flange 15 and begin to move along the channels from the openings in the outer end of the flange towards the groove 19 at the inner end 20 of the channels.

As the channels 16 on each side of the centre of the flange are angled inwardly towards each other, the channels act as a cam surface and movement of the beads 27 of the locking pin through the channels 16 draws the two rods 26 of the locking pin axially towards one another by compressing the spring member 30 between the mounting bosses at the inner ends of the rods.

Figure 6C:
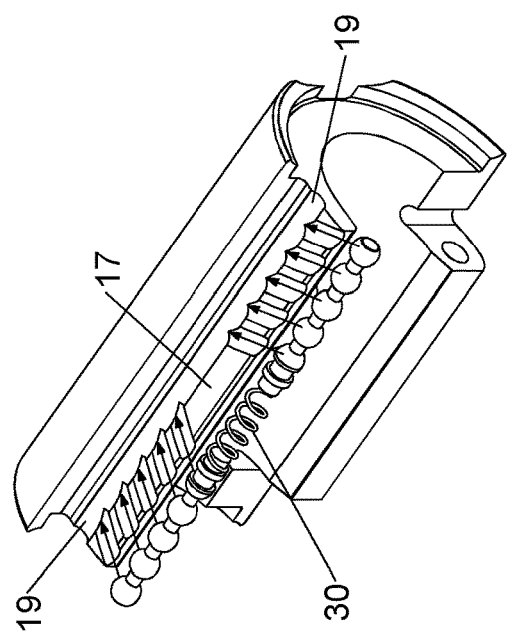
Figure 6D:
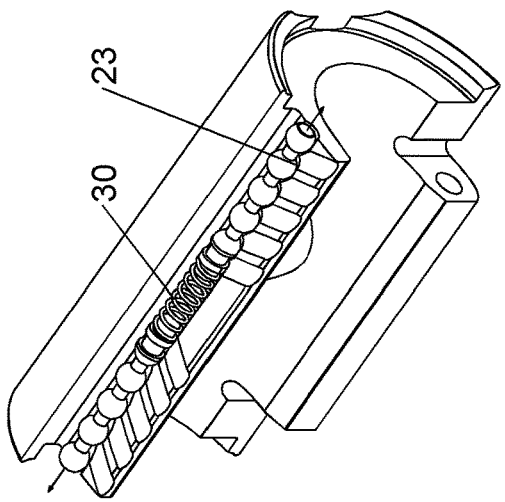

FIG. 6C shows the beads 27 of the locking pin at the inner ends 20 of the channels in the upper surface of the flange and in this position, the spring member 30 is in the fully compressed and energised position. The spring member 30 is held in this position by the location of the beads 27 in each of the individual spaced channels 16 and this prevents the locking member from moving back to the rest or extended position.

As the distal ends of the two segments of the transport assembly tool are brought together and the two components of the connection mechanism 4 pass into full cooperation, i.e. when the distal ends 10, 11 of the segments are as shown in FIG. 2, the beads 26 of the locking pin 25 pass out of the inner ends 20 of the channels 16 and the locking pin 25 enters the shallow groove 19 behind the inner ends 20 of the channels.

Figure 6E:
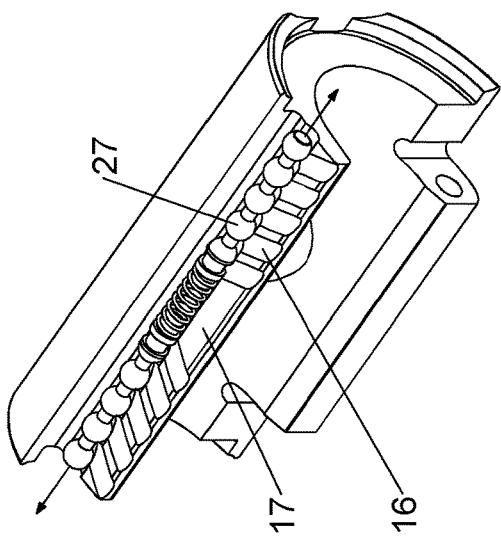
Figure 6F:
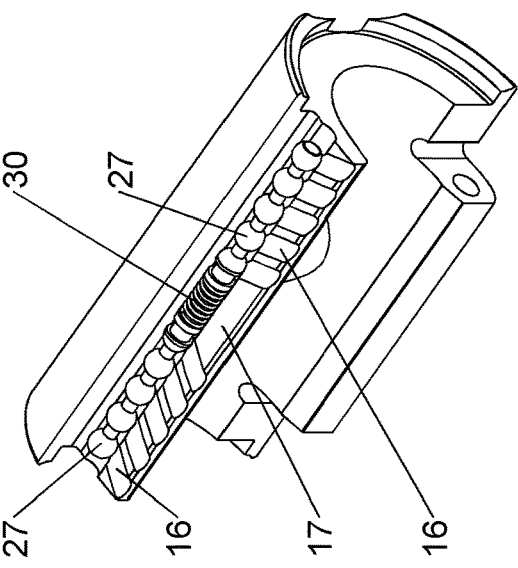
Figure 7A:
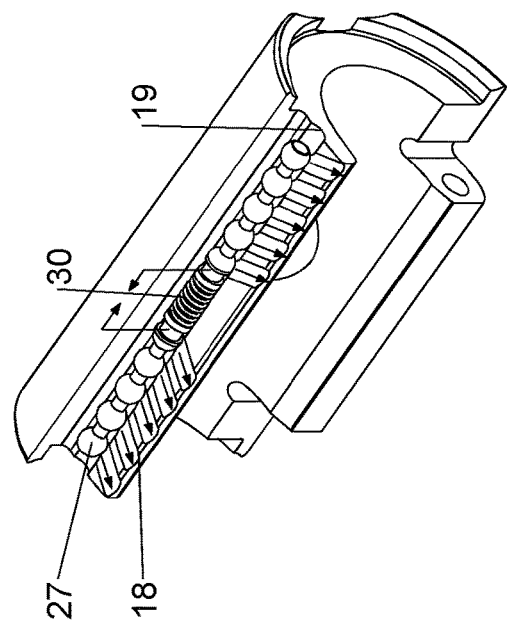
FIGS. 7A-7C show the movement of the locking pin from an unlocked to a locked position to move the two components of the transport assembly to an open position.
Figure 7B:
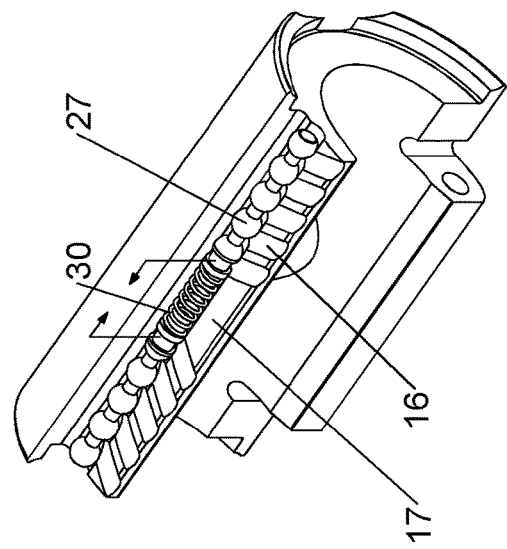
Figure 7C:
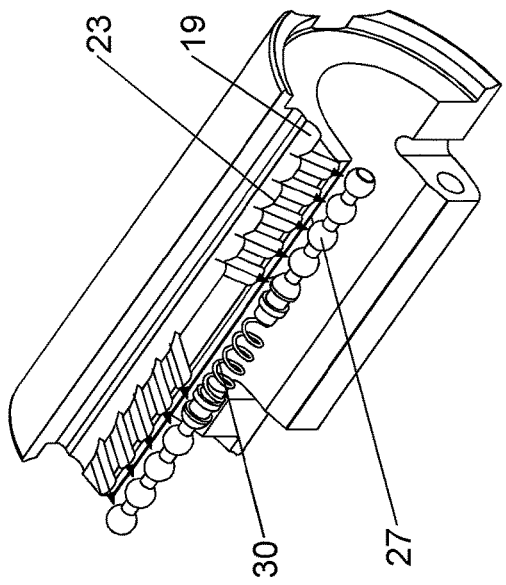

As soon as the beads 26 pass out of the inner ends 20 of the channels, the force acting on the spring member 30 to compress the spring is released and the spring member 30 can return to the extended rest position which pushes the outer ends of the two rods 26 of the locking pin 25 apart and thus the beads 27 on the rods move out of registry with the inner ends 20 of the channels 16 in the flange. This position is shown in FIGS. 6E and 6F.

Once the locking pin 25 is released to the extended position, the distal ends 10,11 of the shell segments of the tool 1 are held firmly in the closed position as the beads 27 of the locking pins 26 no longer align with the inner openings of the channel members 16 and instead abut against the edge of the shallow groove 19. Thus the connection mechanism is firmly and securely held in the closed or locked condition. Force applied to the outer surface of the segments of the transport assembly tool will not affect the integrity of the connection mechanism, and the mechanism cannot be disconnected by pulling the two segments of the tool apart.

Thus the act of closing the connection mechanism by bring the two components of the connection mechanism together also sets the connection mechanism into a locked condition.

As the spring member of the locking pin lies within the internal channel 24 but is visible through the slot 32 in the outer surface of the second component, the operator can quickly check that the spring member is returned to the extended rest position before deploying the transport assembly tool into a wellbore, which therefore provides a further advantage over known connection mechanisms in allowing a visual check of the condition of the closure mechanism without disrupting operation of the tool in which it is incorporated.

The connection mechanism 4 remains in this closed and locked position, with the two cooperating parts of the mechanism securely held together against separation, until the operator intervenes in the connection mechanism 4 to release the mechanism and open the two segments of the shell.

In order to release the connection mechanism 4, a pincer tool such as pair of forks, tweezers or pliars is inserted through the actuation slot 32 and engaged with each end of the stop member 29. For example the arms of the forks may be inserted in the mounting boss 28 between the stop member 29 and the partial end bead 27. The two arms of the forks are drawn together in order to compress the spring member 30 and thus re-energise the locking pin 25. This reduces the distance between the inner ends of the two rods 26 of the locking member. This has the effect of drawing the set of beads 27 each of the rods the locking pin 25 inwards within the shallow groove 19 such that the beads 27 one again align with the inner openings 20 of the channels 16 in the upper surface of the flange. This allows the beads of the locking pin to re-enter the channels 16 in the flange. With the beads 27 engaged in the respective channels 16, as the two components of the connection member 4 are comprised apart, the beads 27 can freely move along the channels 16 thus extending the length of the locking pin 25 as they pass along the channels and returning the spring member 30 to the extended rest position.

As the beads 27 pass out of the outer end 18 of the channels, the two ends of the connection member 4 are fully separated and the tool 1 can be placed into the open position as shown in FIG. 5 to be removed from the downhole tool around which it was placed.

Thus, the present invention provides a connection mechanism in which the interconnecting parts of the mechanism are provided internally of the tool upon which they are mounted. In the embodiments shown, the connection mechanism is mounted on a transport assembly tool however they could also be provided on other tools or components, particularly tools of a tubular nature which provide a body which can surround a tool or member for use in other fields.

In this way, the connection mechanism can be kept free of dirt or debris which is present in the well bore such as well bore fluids which wash over and around the transport assembly tool as it passes through the wellbore. This prevents the connection mechanism from becoming compromised during use which can lead to failure of the connection mechanism and therefore failure of the tool upon which it is mounted. As all of the cooperating elements of the connection mechanism are internally provided within the tool, the risk of any debris becoming lodged within or between the elements of the mechanism is mitigated and further more, the risk of damage to the connection mechanism from debris moving within the fluids in the wellbore striking the connection mechanism is also mitigated.

In the illustrated embodiment, the component carrying the flange is considered the first component and the component within in which the locking pin is secured is considered the second component, however the terms first and second could of course be reversed.

Furthermore, the connection mechanism of the present invention provides for a single action of closing two components together, such as around a tool and in the act of closing the components together, locking the components in the closed condition. Therefore the present invention avoids the need to provide additional security elements such as external locking pins or bolts through cooperating flanges on each side of the tool. This provides for a simpler and faster connection and setting process than current connection mechanisms provide but also provides for a more secure connection which is not susceptible to damage through contact with solids or fluids circulating around the tool in use, particularly when the tool is adapted for use in the oil and gas industry and is likely to be subjected to hazardous conditions with very high temperatures and pressures as are often experienced within the wellbore.

The connection mechanism of the present invention has been described in the embodiment above incorporated into a transport assembly tool for use particularly in deploying equipment and tools into a wellbore. The connection mechanism provides significant advantages to the transport assembly tool over known connection mechanisms in these tools. However, the invention may also find application in relation to other tools and apparatus and indeed in any case where a connection mechanism which can be set into a locked condition during the action of closing the two elements of the connection mechanism together. Furthermore, the connection mechanism of the present invention may find application in relation to tools and components where there is an advantage in providing the cooperating elements of the connection mechanism on internal components of the tool, thus avoiding issues which can arise when a fixing or connection is externally mounted on the tool.

In the embodiments described above, the transport assembly tool is described as a tubular or cylindrical body formed of two shell segments which are hinged together at one side with the connection mechanism of the present invention incorporated into the other side of the segments. It will of course be understood by the skilled person that the transport assembly tool may comprise alternative configurations. For example, the tool may comprise two or more segments which are connected together to form a body with a connection mechanism of the present invention incorporated into the outer most ends of the body. Adjacent segments may be hinged together or the hinge(s) may be replaced by an alternative fixing means. For example, the hinge between the shell segments may be replaced by a further connection mechanism of the present invention. Similarly with multi segment bodies, cooperating elements of a connection mechanism as described above may be provided on each adjacent segment.

In a further alternative embodiment the transport assembly tool may be formed of a flexible unitary body which is formed into a tubular or cylindrical body with the cooperating elements of the connection mechanism provided on each side edge of the body allowing the body to be closed and secured around a tool as required.

The invention claimed is:

1. A connection mechanism comprising first and second components which can be selectively coupled together, the first component comprising first and second locking members which are biased via a spring, said spring being moveable between a first state wherein the first and second locking members are held further apart and a second state in which the spring is compressed while the first and second locking members are drawn closer together, the second component comprising a cam surface for moving the spring from the first state to the second state while the first and second components are brought together and a groove into which the locking members can move to return the spring to the first state when the first and second components are fully engaged together thereby preventing disengagement of the first and second components.

2. The connection mechanism according to claim 1, wherein the second component comprises a flange upon which the cam surface is formed.

3. The connection mechanism according to claim 2, wherein the locking members contact the cam surface while the first and second components are brought together.

4. The connection mechanism according to claim 2, wherein the cam surface comprises one or more channels provided on the flange of the second component.

5. The connection mechanism according to claim 4, wherein the channels are provided in two sets on either side of a centre portion of the flange.

6. The connection mechanism according to claim 5, wherein the channels extend from an outer surface of the flange towards an inner surface of the flange.

7. The connection mechanism according to claim 6 wherein the one or more channels are angled between the outer surface of the flange to the inner surface of the flange.

8. The connection mechanism according to claim 4, wherein the channels extend from an outer surface of the flange towards an inner surface of the flange.

9. The connection mechanism according to claim 1, wherein the locking members contact the cam surface while the first and second components are brought together.

10. The connection mechanism according to claim 1, wherein each locking member is or comprises a sphere.

11. A wellbore transport assembly tool incorporating the connecting mechanism according to claim 1, wherein the connection mechanism further comprises rolling members rotatably connected with the first and/or second components.

12. A connection mechanism comprising first and second components which can be selectively coupled together, the first component comprising a locking member said locking member comprising first and second elongate rods which are axially aligned and connected together via a spring, said spring being moveable between a rest state wherein the first and second elongate rods are held apart and an energised state in which the spring is compressed and the first and second elongate rods are drawn together, the second component comprising a cam surface for initially moving the spring from the rest state to the energised state as the first and second components are initially brought together and a groove into which the locking member can move to return the spring to the rest state once the first and second components are fully engaged together thereby preventing disengagement of the first and second components.

13. An apparatus comprising:
a first segment comprising a first surface having a first groove containing a latching member, wherein a portion of the latching member extends above the first surface, wherein the latching member is movable along the first groove between first and second positions, and wherein a biasing member biases the latching member toward the first position; and
a second segment comprising a second surface having a second and a third groove, wherein the third groove is connected with the second groove, wherein the first and second segments are movable with respect to each other between an unlatched and latched positions, and wherein while the first and second segments are moving from the unlatched position to the latched position:
the latching member slides along the third groove; and then
when the latching member enters the second groove, the biasing member causes the latching member to move to the first position in which:
the latching member is out of alignment with the third groove; and
a sidewall of the second groove prevents the latching member from moving out of the second groove thereby latching together the first and second segments.

14. The apparatus of claim 13 wherein in the unlatched position of the first and second segments the first and second surfaces are away from each other, and wherein in the latched position of the first and second segments the first and second surfaces are disposed against each other.

15. The apparatus of claim 13 wherein in the latched position the first and second grooves are disposed against each other and parallel with respect to each other.

16. The apparatus of claim 13 wherein the latching member is or comprises a spherical member.

17. The apparatus of claim 13 wherein the latching member comprises a plurality of spherical members, wherein the third groove is a first of a plurality of third grooves, and wherein while the first and second segments are moving from the unlatched position to the latched position:
each of the spherical members slides along a corresponding one of the third grooves; and then
when the latching member enters the second groove, the biasing member causes the latching member to move to the first position in which:
each of the spherical members is out of alignment with the corresponding one of the third grooves; and
the sidewall of the second groove prevents each of the spherical members from moving out of the second groove thereby latching together the first and second segments.

18. The apparatus of claim 13 wherein the third groove extends diagonally with respect to the second groove, and wherein the third groove causes the latching member to move from the first position to the second position while the latching member slides along the third groove.

19. The apparatus of claim 18 wherein:
the latching member is a first latching member;

the first groove further contains a second latching member;

a portion of the second latching member extends above the first surface;

the second latching member is movable along the first groove between first and second positions;

the second latching member is biased toward its first position;

the second surface has a fourth groove connected with and extending diagonally with respect to the second groove; and while the first and second segments are moving from the unlatched position to the latched position:

the second latching member slides along the fourth groove thereby causing the second latching member to move from its first position to its second position; and then when the second latching member enters the second groove, the second latching member is biased to move to its first position in which:

the second latching member is out of alignment with the forth groove; and the sidewall of the second groove prevents the second latching member from moving out of the second groove thereby latching together the first and second segments.

20. The apparatus of claim 19 wherein the first and second latching members are further apart while in their first position, and wherein the first and second latching members are closer together while in their second position.

21. The apparatus of claim 13 wherein:

the first and second segments each comprise a first end and a second end;

the first end of the first segment comprises the first surface;

the first end of the second segment comprises the second surface;

the first and second segments are pivotally connected at their second ends;

the first and second segments are configured to be disposed around an object; and the apparatus is operable to connect with the object when the first and second segments are disposed around the object and latched together.

22. The apparatus of claim 21 wherein the object is a downhole tool string, wherein the apparatus further comprises rolling members rotatably connected with the first and/or second components, and wherein the apparatus is or comprises a downhole transport tool for connecting with and conveying the downhole tool string within a wellbore.

* * * * *